United States Patent
Larsson

(10) Patent No.: US 8,849,334 B2
(45) Date of Patent: Sep. 30, 2014

(54) POWER CONTROL IN A WIRELESS SYSTEM HAVING MULTIPLE INTERFERING COMMUNICATION RESOURCES

(75) Inventor: Peter Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 715 days.

(21) Appl. No.: 12/298,690

(22) PCT Filed: Apr. 27, 2006

(86) PCT No.: PCT/SE2006/000517
§ 371 (c)(1),
(2), (4) Date: Oct. 27, 2008

(87) PCT Pub. No.: WO2007/126346
PCT Pub. Date: Nov. 8, 2007

(65) Prior Publication Data
US 2009/0186648 A1    Jul. 23, 2009

(51) Int. Cl.
*H04B 7/00* (2006.01)

(52) U.S. Cl.
USPC ............................................. 455/522; 455/69

(58) Field of Classification Search
CPC ..... H04W 52/08; H04W 52/10; H04W 52/12; H04W 52/226; H04W 52/228; H04W 52/283; H04W 52/34; H04B 7/18543; H04B 2001/6908; H04B 2201/70706; H04B 7/2628; H04B 17/0042; H04B 17/001; H04B 17/005; H04L 1/0002; H04L 47/14; H04L 1/20; H04L 1/004; H04L 1/0001
USPC ............... 455/522, 67.11, 63.1, 69, 127, 110, 455/13.1, 13.4, 134, 226.1, 226.3, 423–425, 455/430, 434; 370/321, 328, 200, 205, 210, 370/310, 311, 316, 318, 320, 331–333, 335, 370/342, 345, 347, 468; 375/130, 142, 147, 375/148, 227, 295–301
See application file for complete search history.

(56) References Cited

U.S. PATENT DOCUMENTS

| | | | |
|---|---|---|---|
| 6,519,705 B1* | 2/2003 | Leung | 713/300 |
| 6,628,956 B2* | 9/2003 | Bark et al. | 455/522 |
| 2003/0083088 A1* | 5/2003 | Chang et al. | 455/522 |

(Continued)

OTHER PUBLICATIONS

"Down-link power control in DS/CDMA cellular mobile radio network"; Chung-Ju Chang; Fang-Ching Ben. Universal personal communications, Publication Year: 1994, pp. 89-93.*

(Continued)

*Primary Examiner* — Golam Sorowar

(57) ABSTRACT

A power control procedure is based on assigning a common control parameter to considered interfering communication resources, and using the control parameter together with a unique power control condition for determining the individual transmit power parameters of the communication resources. In particular, for each one of at least a subset of said communication resources, an individual transmit power parameter is determined based on a power control condition implying that the total received power divided with a path gain of the communication resource should correspond to the common control parameter. The determined transmit power parameters are then used for controlling the transmit powers of the corresponding communication resources. This process helps to maximize aggregate data rate for any given amount of total invested power.

23 Claims, 10 Drawing Sheets

(56) References Cited

U.S. PATENT DOCUMENTS

| | | | |
|---|---|---|---|
| 2004/0022207 A1* | 2/2004 | Leung et al. | 370/321 |
| 2004/0076124 A1 | 4/2004 | Agrawal et al. | |
| 2004/0110477 A1* | 6/2004 | Nishimura et al. | 455/127.1 |
| 2005/0053036 A1* | 3/2005 | Takeda | 370/332 |
| 2006/0003793 A1* | 1/2006 | Ngai et al. | 455/522 |

OTHER PUBLICATIONS

Chung-Ju Chang et al "Down-link Power Control in DS/CDMA Cellular Mobile Radio Network" Universal Personal Communications. 1994. Record, 1994 Third Annual International Conference, Sep. 27-Oct. 1, 1994 pp. 89-93.

* cited by examiner

POWER CONTROL IN A WIRELESS SYSTEM HAVING MULTIPLE INTERFERING COMMUNICATION RESOURCES

TECHNICAL FIELD OF THE INVENTION

The present invention generally relates to communication in wireless systems, and more particularly to a new strategy for controlling transmit parameters such as transmit power parameters in a wireless system having multiple interfering communication resources.

BACKGROUND OF THE INVENTION

The control and adaptation of transmit parameters generally include issues such as power control and rate adaptation.

Power control is used in numerous wireless systems, such as cellular systems, to enable "efficient" communication without expending unnecessary power resources.

Many different power control mechanisms have been proposed. A good overview is given in reference [1], where existing power control methods are classified into two categories, fixed and variable rate power control.

Most power control schemes control the SIR (Signal-to-Interference Ratio) or CIR (Carrier-to-Interference Ratio) to certain target values.

Early work on fixed-rate power control was performed already in the 1960's, with the main objective to obtain the same quality on all links, so-called quality balancing or SIR balancing. The basic concept of SIR balancing was later enhanced, deriving an optimum power assignment for minimizing the outage probability in terms of finding the maximum achievable SIR that all links can simultaneously reach. Balancing for heterogeneous SIR targets has also been investigated.

Some work in this area has focused on developing practical SIR balancing algorithms, without the excessive effort of collecting the necessary information to a centralized controller. For this purpose iterative and distributed balancing algorithms were introduced. Common for these algorithms is the exclusion of background noise, which makes scaling of the power vector necessary. To alleviate this problem some extensions of the distributed algorithms with preset SIR targets and non-zero background noise have been proposed.

In the area of downlink power allocation for CDMA, cell powers may be allocated such that all users in the cell experience the same SIR during convergence to a preset target, taking into account a total sum power constraint. However, this may cause an entire cell to have insufficient quality. Another approach for power control in CDMA is to provide for constant received power at the base station. Unfortunately, this approach generally does not have any significant effect on the co-channel interference.

The so-called Minimum Power Assignment (MPA) problem includes base station selection for finding the lowest possible uplink power vector.

With regard to variable-rate power control, maximum achievable channel capacity has traditionally been a well-examined topic. The capacity regions for a fading uplink single-cell multiple access channel have been found, considering both delay tolerant and intolerant cases. Water filling has also been applied, for example in the time-domain for power and rate to achieve capacity over a fading channel. The results highlight a common characteristic of conventional throughput maximization, namely to allocate resources to good channels.

Greedy power control algorithms generally operate without any SIR targets, and assign high data rates starting with mobiles having high link gain. However, this type of power control is quite unstable and generally results in either maximum or zero power being used.

So-called truncated power control has been considered over fading channels with the objective to avoid loss of capacity when compensating for deep fades by decreasing transmission rate or power or both. A truncated rate adaptation scheme based on suspending transmission when the link gain is below some threshold has been suggested for traffic tolerating longer delays.

Rate adaptation is another example of control and adaptation of transmit parameters, where transmission parameters (normally modulation and coding scheme) used for communication are adapted in order to optimally exploit the potential of the communication medium, usually to provide high data transfer rates along with low bit error rates.

Early work on rate adaptation in DS-CDMA considered minimization of the total downlink transmitted power given constraints on individual user data rates. An alternative approach is to maximize the sum rate of an uplink of a single-cell system with the requirement that the energy to noise density per bit exceeds a minimum level for each link. It has also been suggested to maximize the sum rate in a CDMA system with the requirement that the energy to noise density per bit should be equal to a certain level for each link. Yet another suggested approach is to maximize the sum rate of an uplink in CDMA subject to a constraint on total received power where the sum of all received powers (noise and interference excluded) should be equal to a constant.

Although some of the prior art schemes may provide quite satisfactory performance in specific cases, the conventional power/rate control schemes generally leave room for considerable improvements.

Reference [2] relates to stream control in networks with interfering MIMO links. The throughput performance is targeted and the basic idea is to maximize throughput by introducing a constraint to limit the number of independent streams for each transmitting node in a network of interfering MIMO links.

SUMMARY OF THE INVENTION

The present invention overcomes these and other drawbacks of the prior art arrangements.

It is a general object of the present invention to provide an improved scheme for controlling transmit parameters in a wireless communication system having multiple interfering communication resources.

In particular it is a specific object to maximize the total aggregate data rate or throughput of the considered communication resources.

Another specific object is to provide a power control scheme that jointly accounts for the different power control objectives of maximizing aggregate data rate and balancing communication quality.

It is also desirable to avoid excessive total interference and to avoid the use of unnecessary amounts of transmit power.

It is also an object to provide robustness over fading channels.

It is a specific object to provide a power control scheme customized for optimizing the throughput performance of delay tolerant (best effort) traffic.

It is a further objective of optimizing system performance when links are interfering with each other.

These and other objects are met by the invention as defined by the accompanying patent claims.

The invention generally targets a wireless communication system having multiple interfering communication resources. Briefly, the invention is based on assigning a common control parameter to the considered communication resources, and using the control parameter together with a unique power control condition for determining the individual transmit power parameters of the communication resources. In particular, the idea is to determine, for each one of at least a subset of said communication resources, an individual transmit power parameter based on a power control condition implying that the total received power divided with the path gain of the communication resource should correspond to the common control parameter. The determined transmit power parameters are then used for controlling the transmit powers of the corresponding communication resources. To clarify, the total received power is normally equal to the received power from the desired source, from interfering undesired resources, and receiver internal and external noise.

By using the proposed power control condition when determining the transmit power parameters, it is possible to maximize aggregate data rate for any given amount of total invested power.

It is useful to use an aggregate power constraint so as to offer as much aggregate throughput as possible for the total amount of power that the system operator is willing to invest. In fact, the common control parameter and the aggregate power constraint are intimately interrelated, and the control parameter is typically assigned such that the aggregate transmit power of the considered communication resources fulfills a given aggregate transmit power constraint. The common control parameter or equivalently the power constraint may, if desired, be adjusted depending on QoS (Quality of Service) requirements and/or traffic load (global or individual).

The invention provides lower average power consumption, with reduced power consumption costs. Avoidance of transmitting excessive power makes sense as battery standby time can be extended, but also in order to meet regulatory requirements on radiated power.

The power control computations can for example be implemented in a direct (matrix-based) computation procedure or in an iterative computation procedure. The latter is suitable for distributed operation, which normally is of greatest practical use.

The total received power generally includes the power of the desired signal of the considered communication resource as well as interference from other communication resources plus noise.

Preferably, the invention also involves rate adaptation where the individual transmit rate, for each considered communication resource, is controlled based on the determined transmit power and experienced transmission quality of the communication resource.

In practical systems, the transmit powers obviously need to be greater than zero and often smaller than a maximum power level. In a specific preferred embodiment of the invention, the invention therefore allows for individual power (upper and/or lower) limit settings for each considered communication resource.

Solving the maximum aggregate rate under a power constraint, may result in impractical high rates (or spectrum efficiencies), since signals constellations may be limited. An important, but optional extension of the invention is therefore a mechanism that ensures that the transmit power is controlled for each considered communication resource such that the rate does not exceed a certain upper rate limit. In this context, the communication quality of the considered resource should preferably not violate a quality constraint corresponding to the upper rate limit. This actually means that the overall power control scheme allows for a mixture of two different power control objectives, jointly accounting for aggregate rate maximization and quality balancing.

The interfering communication resources are preferably radio transmission resources and may for example correspond to multiple interfering links between transmitter-receiver node pairs. The invention is however not limited thereto, but is actually applicable in many different scenarios and applications. For example, the multiple interfering communication resources could be frequency-based communication resources, code-based communication resources and/or spatial-multiplexing-based communication resources.

The invention is for example applicable to MIMO (Multiple Input Multiple Output) communication. MIMO system simulations reveal, in contrast to current beliefs, that the MIMO capacity scales linearly with the number of antennas in the MIMO array even in a cellular system with interference between MIMO sub-channels. The MIMO scenario is further of interest since it has been found that the probability that a user experiences a rate identical to zero is reduced with increasing number of antennas.

The invention is also applicable to sub-carriers in a wireless OFDM (Orthogonal Frequency Division Multiplexing) or OFDMA (Orthogonal Frequency Division Multiple Access) system, or code-based resources in a wireless CDMA (Code Division Multiple Access) system. In the latter case, this could be a CDMA downlink system, or CDMA uplink system where the base station employs multiuser detection.

In a cellular system, the power (and rate) control scheme also act as an automatic control of whether a (selected) user uses a resource in a cell or not. Hence, the resource reuse is automatically controlled over the system.

Although the invention is generally applicable it has turned out to be especially advantageous for optimizing the throughput performance of delay tolerant (best effort) traffic.

The invention offers the following advantages:
Possibility of maximizing aggregate rate or throughput for any given aggregate power.
The invention can be applied in many different scenarios.
Low average power consumption, yielding improved battery time and reduced power consumption costs.
Robustness under fading channels.
The interference at a distance remains fairly constant which facilitate less affected power and rate interactions between links and cluster of links.
Best effort traffic optimized (yet mostly good enough for real time traffic).
Allowing for simple, iterative, potentially distributed, stable and well-behaving power control scheme.
Upper and/or lower individual power constraints may be incorporated in the proposed power and rate control procedure.
Upper and/or lower individual rate constraints may be incorporated in the proposed power and rate control procedure.
Jointly accounting for aggregate rate maximization and quality balancing (as a trade-off).
The resource reuse is automatically managed, instead of static network planning for reuse, in the sense that some link resources may be forced to use zero power.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
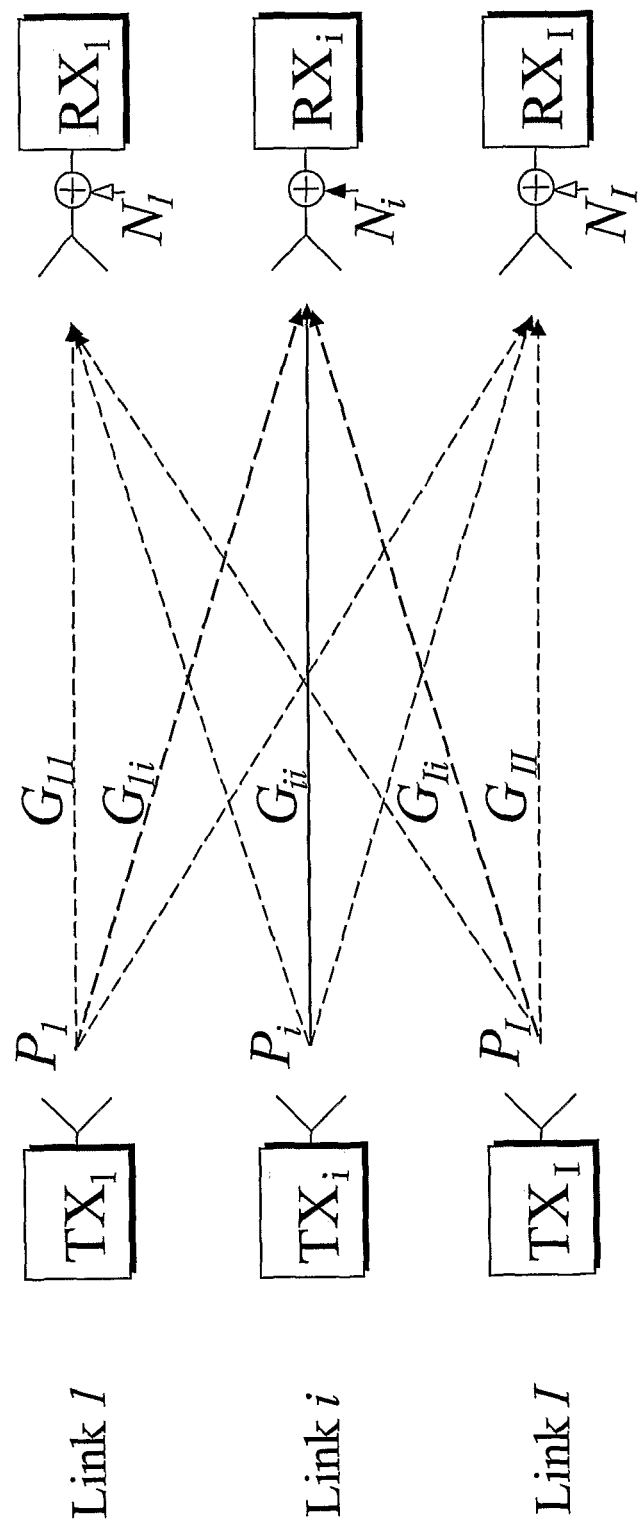
FIG. 1 is a schematic diagram illustrating multiple interfering links between respective transmitter-receiver node pairs.

Throughout the drawings, the same reference characters will be used for corresponding or similar elements.

Introduction

The invention generally targets a wireless communication system having multiple interfering communication resources; generally radio transmission resources.

The communication resources may for example correspond to multiple interfering links between respective transmitter-receiver node pairs, as illustrated in FIG. 1.

In FIG. 1, a number, I, of links are considered between I transmitter-receiver pairs, assuming that the various links interfere with each other. The parameter $P_i$ is the transmit power of transmitter $TX_i$, $N_i$ is the noise experienced by receiver $RX_i$, and G is the path gain matrix, where $G_{ij}$ is the path gain from transmitter i to receiver j.

The invention is however not limited thereto, but is actually applicable in many different scenarios and applications. For example, the multiple interfering communication resources could be frequency-based communication resources, code-based communication resources, spatial-multiplexing-based communication resources and/or combinations thereof.

The invention can be applied for spatial-multiplexing-based MIMO (Multiple Input Multiple Output) communication. The invention is thus applicable to multiple interfering MIMO links, but also for possibly interfering MIMO sub streams within a single MIMO link.

Figure 2:
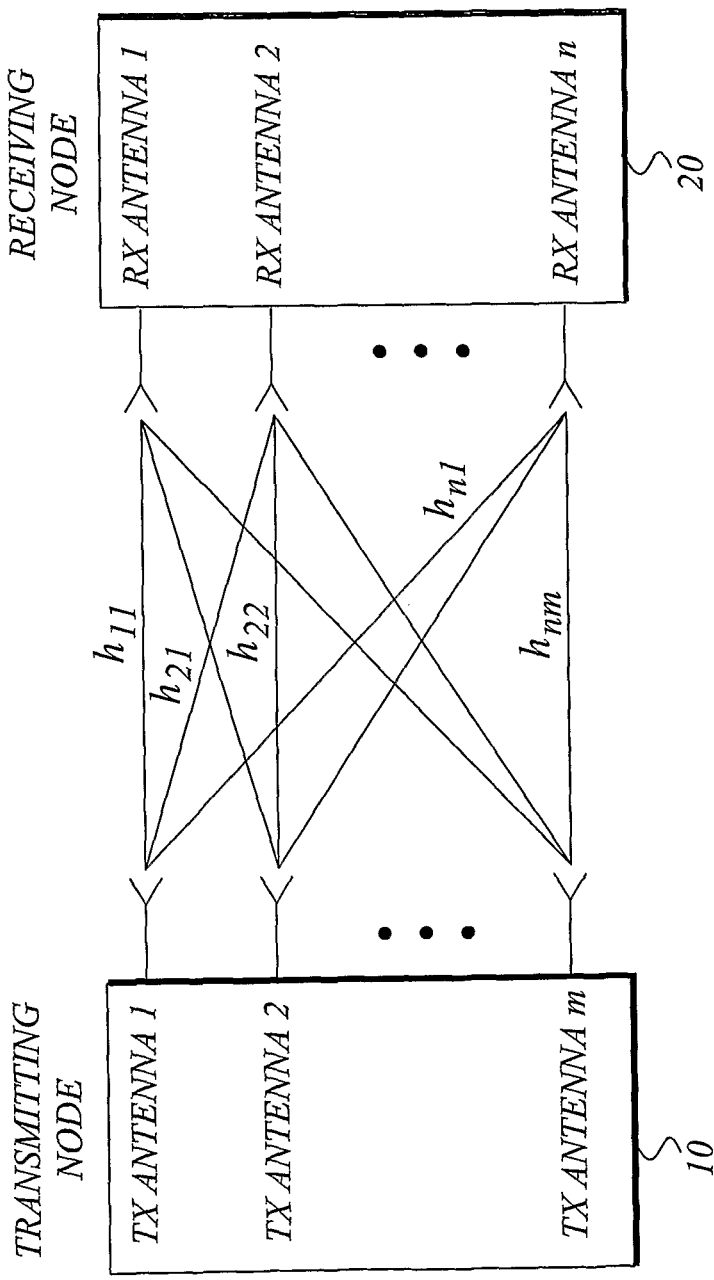
FIG. 2 is a schematic diagram illustrating a MIMO link between a transmitter-receiver node pair equipped with multiple antennas.

FIG. 2 schematically illustrates an example of a classical MIMO system, where a transmitting node 10 has multiple m transmit antennas and a receiving node 20 has multiple n receive antennas to provide for multiple interfering MIMO substreams. In matrix form, the channel model can be expressed as:

$$y = Hx + w$$

$$x = G(c_1, \ldots, c_p),$$

where y is the received signal vector, H is a n by m complex channel matrix, x is the transmitted signal vector, w is a vector representation of white noise, G is a code matrix and c is a symbol in a code book, and p is the number of symbols per block. The complex channel gain matrix H can be written as:

$$H = \begin{bmatrix} h_{11} & \ldots & h_{1m} \\ \vdots & \ddots & \vdots \\ h_{n1} & \ldots & h_{nm} \end{bmatrix}$$

where $h_{ij}$ is the complex channel gain from transmit antenna j in the transmitting node to receive antenna i in the receiving node.

It should be understood that there may exist several MIMO, MISO, SIMO and/or other links in a system, each link having at least one (sub)stream (only the MIMO link may have multiple substreams). For example, one or more of the transmitters and/or receivers in the system of FIG. 1 may be equipped with more than one antenna to provide for MIMO, MISO and/or SIMO type of operation.

The invention is also applicable to sub-carriers in a wireless OFDM (Orthogonal Frequency Division Multiplexing) or OFDMA (Orthogonal Frequency Division Multiple Access) system, or code-based resources in a wireless CDMA (Code Division Multiple Access) system. In the latter case, this could be a CDMA downlink system, or CDMA uplink system where the base station employs multiuser detection.

In the context of multiple interfering communication resources, the invention mainly focuses on global rate or throughput maximization, preferably while avoiding excessive total interference and avoiding using unnecessary amounts of transmit power. For example, addressing the total interference of a group of communicating stations makes sense as the interference of this group is detrimental for other groups of communicating stations. Avoidance of transmitting excessive power also makes sense as battery standby time can be extended, but also in order to meet regulatory requirements on radiated power.

A basic idea of the invention is to assign a common control parameter to the considered communication resources, and use the control parameter together with a unique power control condition for determining individual transmit power parameters of the interfering communication resources.

In general, the idea is to determine, for each one of at least a subset of said communication resources, an individual transmit power parameter based on a power control condition implying that the total received power divided with the path gain of the communication resource should be substantially equal to the common control parameter.

Figure 3:
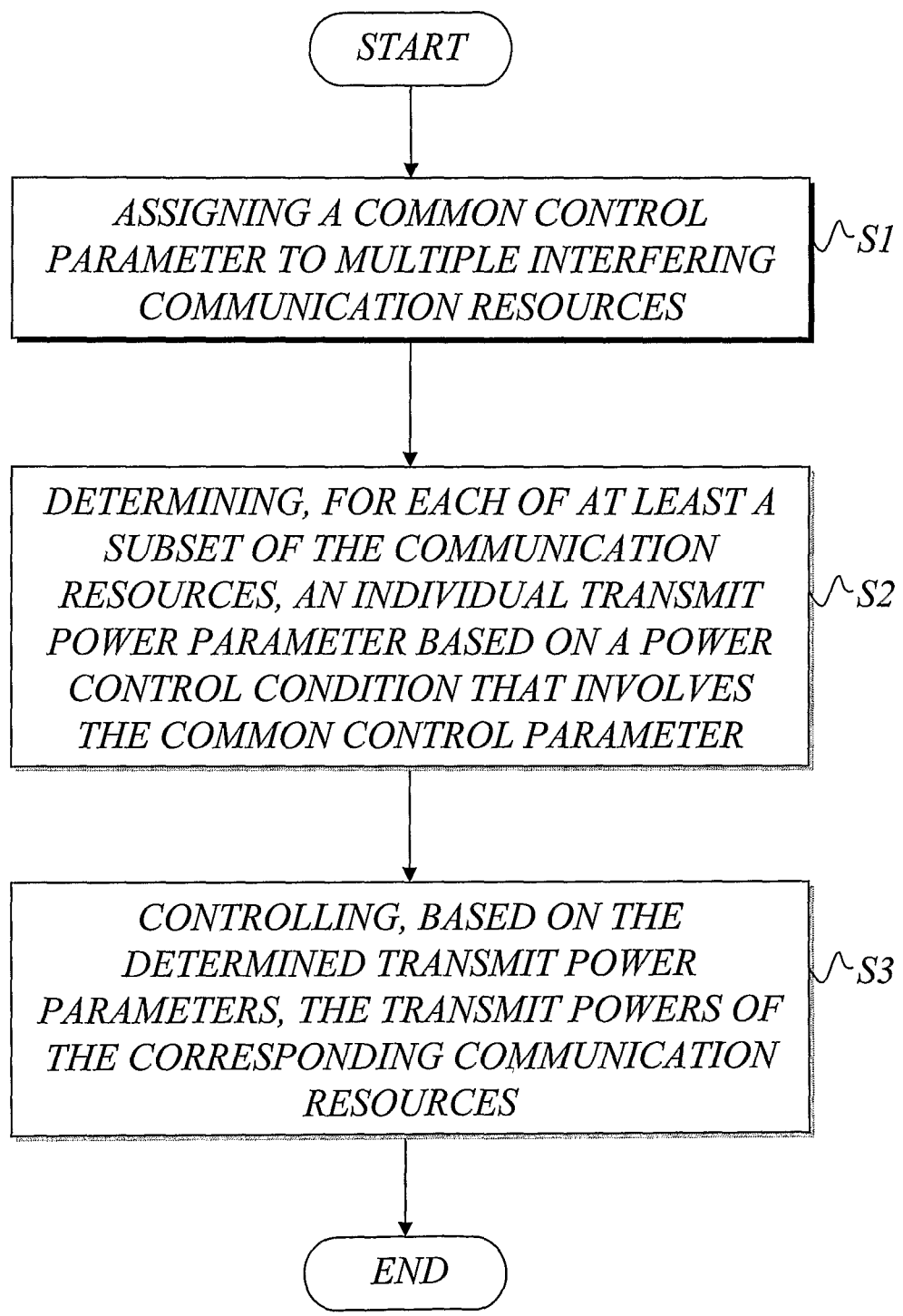
FIG. 3 is a schematic flow diagram of an exemplary method for controlling transmit parameters in a wireless communication system according to a preferred embodiment of the invention.

As illustrated in the schematic flow diagram of FIG. 3, the invention basically involves assignment of a control parameter that is common to the considered set of interfering communication resources (S1). Next, the idea is to determine, for each one of at least a subset of the communication resources, an individual transmit power parameter by using a power control condition implying that the total received power divided with the path gain of the communication resource corresponds to the common control parameter (S2). Finally, the transmit powers associated with the communication resources are controlled in dependence on the determined transmit power parameters (S3).

The proposed power control condition allows maximization of the aggregate data rate for any given amount of total invested power, and is therefore sometimes referred to as an optimality condition.

It is useful to use an aggregate power constraint so as to offer as much aggregate throughput as possible for the total amount of power that the system operator is willing to invest. The invention generally provides lower average power consumption, with reduced power consumption costs.

The common control parameter and the aggregate power constraint are intimately interrelated, and the control parameter is typically assigned such that the aggregate transmit power of the considered communication resources fulfills a given aggregate transmit power constraint. The common control parameter or equivalently the power constraint may, if desired, be adjusted depending on QoS requirements and/or traffic load.

The invention generally relates to the control and adaptation of transmit parameters. The transmit parameters include transmit power parameters to provide power control, but may also include other types of parameters such as transmit parameters related to transmit rate to support rate adaptation.

Preferably, in addition to the above suggested power control scheme, the invention also involves rate adaptation where the individual transmit rate, for each considered communication resource, is controlled based on the determined transmit power and experienced transmission quality of the communication resource.

The required power control computations can be implemented by a direct computation method or an iterative computation method. The iterative computation of the transmit powers is especially suitable for distributed implementation.

The invention does not require a strict adherence to the optimality condition. In practice, the transmit power may have to be smaller than a maximum power level. In a specific preferred embodiment of the invention, the invention therefore allows for individual power limit settings for each considered communication resource. Solving for maximum aggregate rate, may sometimes result in impractical high rates. In such a case, it may be useful to set the transmit power such that the corresponding transmit rate of the communication resource does not exceed a given maximum transmit rate.

Preferably, the communication quality of the considered resource should not violate a quality constraint corresponding to the upper rate limit. This means that the overall power control scheme allows for a mixture of two different power control objectives, jointly accounting for both aggregate rate maximization and quality balancing to provide a trade-off between the conflicting objectives.

Moreover, like an upper rate limit is often of interest in practice, one may also as an optional extension introduce a lower rate limit. This lower limit serves each active user such that they have a guaranteed minimum data rate, but occasionally when opportunities are given (due to the gain matrix situation), it is possible to send with a higher rate.

In other words, an exemplary embodiment of the invention generally concerns the issue of determining transmit powers based on maximizing an objective function representative of the total aggregate data rate of said multiple interfering communication resources under an aggregate transmit power constraint, while taking interference into account.

In an optional extension, another exemplary embodiment of the invention concerns the issue of determining transmit powers based on at least two different power control objectives: a) maximizing an objective function representative of the total aggregate data rate of said multiple interfering communication resources under an aggregate transmit power constraint and b) balancing of the communication quality of said communication resources. In this way, the invention jointly accounts for aggregate rate maximization and quality balancing.

For a better understanding, the invention will now be described with reference to an exemplary system model corresponding to the system of FIG. 1. However, it should be kept in mind that the invention is not limited thereto and that the general principles are applicable to other types of wireless communication resources.

System Model

In the following, link rates are modeled as the Shannon capacity and interfering signals as AWGN (Additive White Gaussian Noise).[1] The aggregate rate of a wireless system with I links may be defined as the sum of the individual link rates:

[1] While both assumptions are mere simplifications, they are not too far off from reality. For in stance, the Shannon capacity can be approached fairly closely with modern error correction codes, but the following derivation also holds true if real link rates are just a scaling factor different from the Shannon capacity.

$$R = \sum_{i=1}^{I} R_i = \sum_{i=1}^{I} \log_2(1 + \Gamma_i), \quad (1)$$

where the signal to noise and interference ratio at the receiving node of link i may be defined as:

$$\Gamma_i = \frac{G_{ii} P_i}{N_i + \sum_{j \neq i} G_{ji} P_j} \quad (2)$$

where G is the path gain, P is a power and N is a noise power. The aggregate power of the system may be defined as the sum of the individual link powers:

$$P = \sum_{i=1}^{I} P_i. \quad (3)$$

In an exemplary embodiment of the invention, an objective problem formulation may be defined as:

Maximize $R$ subject to $P_{tot} = P$ \quad (4a)

As will be explained later on, it is possible to introduce an upper and/or lower individual power constraint, but this is initially avoided for clarity and brevity.

The problem in (4a) is straightforwardly solved by solving the following Lagrange problem:

$$\sum_{i=1}^{I} R_i + \lambda \left( P_{tot} - \sum_{i=1}^{I} R_i \right) = 0 \quad (4b)$$

together with the constraint (3), where $\lambda$ is the Lagrange multiplier. After taking the partial derivates with respect to $P_i$, one yields the condition (for each link):

$$\frac{N_i + \sum_{\forall j} P_j G_{ji}}{G_{ii}} = \lambda^{-1} \ln(2) = C. \quad (5)$$

Since λ is a constant, C is also a constant. Note that the sum in equation (5) is normally over all sending stations, in contrast to the sum in equation (2).

Equation (5) represents the power control condition that must be achieved for all links in order for the aggregate rate to maximize given a certain amount of power to be distributed over the sending stations. The interpretation of equation (5) is that when each receiving station sums the received power of all signals at the antenna (i.e. noise+interference+signal of interest) and divides this sum with the path gain of the corresponding sender-receiver link, the net result should be a constant. This constant is generally the same for all receiving stations.

For example, assuming that power is controlled to fulfill equation (5), each sending station preferably controls their transmit rate in accordance with the experienced instant signal to interference ratio, or some other suitable quality indication.

From the exemplary equation (5), it is possible to make some more observations. First, equation (5) dictates that $P_i \leq C$, hence limiting transmit powers upwards, which implies a kind of stability in the system. Moreover, if $G_{ii} \gg G_{ij}$, $\forall j \neq i$ and $N_i \ll P_i G_{ii}$, then all $P_i = C$, i.e. all stations will send with substantially the same power. In practice however, adjacent cell interference always exist so the condition for identical powers ($G_{ii} \gg G$) is not valid. Also, it is normally interesting to operate the system with a minimum required amount of power, so the noise is slightly smaller than the received power or $N_i \approx k P_i G_{ii}$, where k is a value slightly smaller than 1.

The power constraint, or equivalently the Lagrange multiplier or the constant C, can preferably be adjusted depending on the traffic load (global or individual load), or possibly fixed. The important criterion for aggregate rate maximization is that the ratio defined in equation (5) is a constant that is common for all sender-receiver links. When using the optimality condition represented by equation (5), the power distribution will be optimal (with respect to aggregate rate) for any resulting aggregate transmit power.

In the following, two examples of how to perform the computations will be described. The first one allows direct computation of the transmit powers and lends itself to central control. The second one allows iterative computation of the transmit powers and is suitable for distributed control, but could evidently also be used for central control. Upper and/or lower power limits will be introduced, and later also upper and/or lower rate limits.

Direct (Matrix-Based) Computation

Equation (5) may be rewritten into an equivalent matrix form:

$$p = G^{-1}(Cg - n), \quad (6)$$

where $p \in R^{I \times 1}$, $n \in R^{I \times 1}$ and $g \in R^{I \times 1}$ are transmit power, noise power and gain (real and positive numbered) vectors respectively, and $G \in R^{I \times I}$ is a gain (real and positive numbered) matrix. The gain vector is composed of the diagonal elements of G, i.e. $g = [G_{11} \; G_{22} \ldots G_{II}]^T$. Note that since the elements in G are positive and random variables, the gain matrix G is statistically guaranteed to be of full rank and hence invertible.

From equation (6) and the power constraint the constant C may be derived as:

$$C = \frac{P_{tot} + 1G^{-1}n}{1G^{-1}g}, \quad (7)$$

where 1 is a 1×I row vector with mere ones, i.e. 1={1 1 ... 1}. Equation (7) may then be inserted into (6) to determine the required transmit powers. By merging (6) and (7), the following equation is derived:

$$P_i = G^{-1}\left(\frac{P_{tot} + 1G^{-1}n}{1G^{-1}g}g - n\right), \quad (8)$$

The rates are then given by the Shannon rates in (1), through (2).

Upper and/or Lower Power Limits

The above solution does not directly account for the non-negative requirement of transmit powers, i.e. $P_i \geq 0$, or more generally a low limit $P_i \geq P_{min}$. This is evident in (6) as one may risk determining negative powers. Moreover, upper power limits, $P_i \leq P_{max}$, are also not directly considered in the problem so far.

There are different ways of dealing with this. First, $P_{tot}$ could be selected large enough to ensure non-negative powers and then all equations above automatically hold. Second, users may be removed so that the condition is fulfilled. Third, one may notice that (4b) does not prevent some links from assuming a fixed power, since the partial derivative on right and left side for this link then yields 0=0. Hence it is possible to slowly increase $P_{tot}$ (or equivalently the Lagrange multiplier) until a first user's transmit power approaches its limit value, and then set the power to this limit value, and subsequently continue to increase $P_{tot}$ (or equivalently the Lagrange multiplier) and treat the next link approaching its limit value in a similar manner. Nevertheless, the problem is fairly easy to solve for the iterative computation based scheme, and that is the focus in the following.

Iterative (Scalar-Based) Computation

In the following, an example of an iterative algorithm that also handles the non-negative power criterion as well as a maximum power criterion is presented. First, let's introduce a function $F_i^{(m)}$ defined as:

$$F_i^{(m)} = \frac{S_i^{(m)}}{G_{ii}^{(m)}}, \quad (9)$$

where $$S_i^{(m)} = N_i^{(m)} + G_{ii}^{(m)} P_i^{(m)} + \sum_{j \neq i} G_{ji}^{(m)} P_j^{(m)},$$

and (m) is the iteration index. As was seen in equation (5), equation (9) should be driven to a constant value (previously denoted C), let's call it $F_{Target}$ in the iterative scheme.

The deviation from the required reception target is defined as:

$$\Delta F_i^{(m)} = F_i^{(m)} - F_{Target}, \quad (10)$$

The dependency of equation (9) to the powers $P_i$ is known from equation (5). Hence one may differentiate (9) with respect to the powers $P_i$, rewriting the equation in matrix form and solving for the delta change in $P_i$ required to compensate for the undesired deviation $\Delta F_i^{(m)}$:

$$\Delta P = \text{diag}(g) G^{-1} \Delta F, \quad (11)$$

where diag(g) is a square matrix with g on the diagonal elements and zeros otherwise.

The iterative power control formula may now be written:

$$P^{(m+1)} = P^{(m)} - \Delta P^{(m)} = P^{(m)} - \beta \cdot \text{diag}(g) G^{-1} \Delta F^{(m)}, \quad (12)$$

where $0<\beta\leq1$ is a parameter that is set in accordance with a desired convergence speed.

It can be noted that when considering distributed computation the full matrix G and its inverse need to be known in order to use equation (12). However, (12) can be well approximated by:

$$P^{(m+1)} = P^{(m)} - \beta \cdot \Delta F^{(m)}, \quad (13)$$

when $G_{ii} > G_{ij}$, i.e. other-link interference is lower than the received power of the own link's signal. It is noticed, that by this approximation, all equations becomes decoupled and each link may control its power individually and in a distributed manner.

One of the objectives of the power control scheme was to control the aggregate power to equal a desired total power. This is a bit tricky in the iterative scheme if it is implemented in a distributed manner. This can be handled in different ways.

In a first exemplary method, the requirement on a fixed total power is released, and instead it is sufficient to observe that the power distribution is "optimal" for any resulting aggregate power due to the Lagrange problem formulation. From experiments, it is found that the resulting aggregate power varies very little anyway, so this approximate solution seems fine.

In a second exemplary method, a central station in the network, e.g. an RNC, may collect information of the gain matrix G and calculated $F_{Target}$ and then distribute this information to the receivers. Another alternative here is that each sender reports its used power to a central station in the network, e.g. an RNC, which subsequently calculates a new updated $F_{Target}$ that is then distributed to the receivers.

Iterative Computation—Upper and/or Lower Power Limits

To manage individual transmitter constraints such as an upper and/or a lower power limit, the following modifications to the power update may be determined after equation (13) has been computed:

$$\tilde{P}^{(m+1)} = \max\{P^{(m+1)}, 0\}$$

$$\tilde{\tilde{P}}^{(m+1)} = \min\{\tilde{P}^{(m+1)}, P_{max}\}, \quad (14)$$

Simulations based on equation (13) indicate that the system converges to the desired criteria, i.e. $F_{Target}$. Simulations based on equation (14) also indicate that the system manages lower and upper limits of the transmit power.

Upper and Lower Rate Limits

As transmit powers have a limited range, upper and/or lower transmit power limits may optionally be introduced. The lower limit $P_{min}$ may be set to zero, whereas $P_{max}$ is some suitable non-negative power value given. Both values could be set per user terminal or to a common value for all terminals. It was seen that in the iterative scheme, the upper and lower power limit conditions were straight forward to include, simply by not allowing the computed power to go beyond $P_{min}$ and $P_{max}$. Now, for practical modulation and coding schemes (MCSs), there is normally also an upper maximum rate at which a station may transmit. In the following, an example of a mechanism for incorporating such an upper rate limit, but optionally also a lower rate limit, will be described. In this particular example, the focus will be on iterative computation of transmit powers, but the basic idea of limiting the rates is applicable also to direct computation.

First, a CIR balancing criterion may for example be introduced according to:

$$\frac{P_i G_{ii}}{N_i + \sum_{\forall j \neq i} P_j G_{ji}} = F_{target}^{(CIR)}(\text{high}) \quad (15)$$

The purpose of this criterion to prevent some terminals with high rates from violating this condition given by the signal to interference condition $F_{target}^{(CIR)}(\text{high})$ corresponding to a desired maximum rate $R_{max}$. If a terminal is sending with some power $P_i^{(m)}$, the desired change in power level can be calculated such that the upper CIR balancing occurs:

$$\Delta F_{(CIR)}(\text{high}) = P_i^{(m)} - F_{Target}^{(CIR)}(\text{high}) \frac{N_i^{(m)} + \sum_{\forall j \neq i} P_j^{(m)} G_{ji}^{(m)}}{P_i^{(m)} G_{ii}^{(m)}}, \quad (16)$$

For example, the rate may be limited to an upper limit based on the following approach. If the CIR balancing method suggests that power should be decreased with a larger power value than the rate optimizing scheme, one should follow that suggestion. Otherwise, the rate optimizing scheme should be followed. This idea is formally described below. In this case, the power update should preferably be:

$$P^{(m+1)} = P^{(m)} - \begin{cases} \beta_2 \cdot \Delta F_{CIR}^{(m)}(\text{high}), & \text{if } \Delta F_{CIR}^{(m)}(\text{high}) > \Delta F^{(m)} \\ \beta_1 \cdot \Delta F^{(m)}, & \text{Otherwise}, \end{cases} \quad (17)$$

where $\beta_1$ and $\beta_2$ are speed of convergence parameters (allowing for different speeds if desired). Note that upper and lower power limits may be applied on top of this if desired.

In a similar manner it is possible, if desired, to impose a lower rate limit if a minimum rate $R_{min}$ performance is required. The corresponding relation for a lower rate limit is then first a desired control criterion:

$$\frac{P_i G_{ii}}{N_i + \sum_{\forall j \neq i} P_j G_{ji}} = F_{target}^{(CIR)}(\text{low}), \quad (18)$$

If a terminal is sending with some power $P_i^{(m)}$, it is possible to calculate the desired change in power level such that the lower CIR balancing occurs:

$$\Delta F_{(CIR)}(\text{low}) = P_i^{(m)} - F_{Target}^{(CIR)}(\text{low}) \frac{N_i^{(m)} + \sum_{\forall j \neq i} P_j^{(m)} G_{ji}^{(m)}}{P_i^{(m)} G_{ii}^{(m)}}, \quad (19)$$

In this particular example, a possible resulting power control setting incorporating both a lower and upper rate limit for the power control scheme may look like this:

$$P^{(m+1)} = P^{(m)} - \begin{cases} \beta_2 \cdot \Delta F_{CIR}^{(m)}(\text{high}), & \text{if } \Delta F_{CIR}^{(m)}(\text{high}) > \Delta F^{(m)} \\ \beta_2 \cdot \Delta F_{CIR}^{(m)}(\text{low}), & \text{if } \Delta F_{CIR}^{(m)}(\text{low}) < \Delta F^{(m)} \\ \beta_1 \cdot \Delta F^{(m)}, & \text{Otherwise}, \end{cases} \quad (20)$$

Implementation Aspects

In the following, sender and receiver architectures will be described in more detail, mainly with focus on a distributed power (and rate) control scheme.

Figure 4:
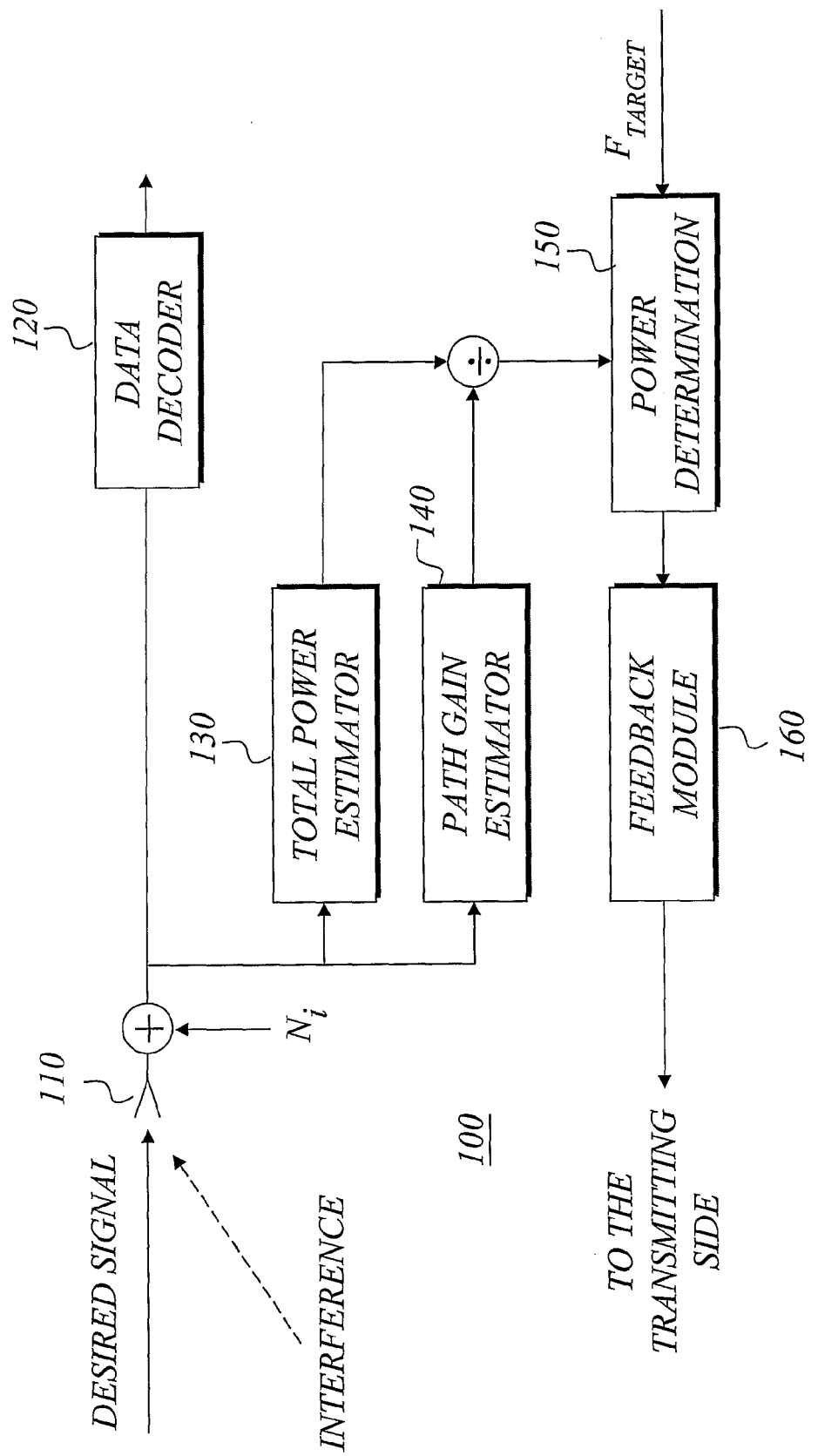
FIG. 4 is a schematic block diagram of receiver functionality according to a preferred exemplary embodiment of the invention.

FIG. 4 is a schematic block diagram of receiver functionality according to a preferred exemplary embodiment of the invention. The receiver functionality 100 relevant to the invention basically includes an antenna 110 with associated circuitry (not shown for simplicity), a data decoder 120, a power estimator 130, a path gain estimator 140, a power determination module 150 and a feedback module 160. In practice, the total received power, including the power of the desired signal of the considered communication resource as well as interference from other communication resources plus noise, is normally estimated or explicitly measured by the power estimator 130. The path gain of the considered communication resource is preferably estimated by the path gain estimator 140. Based on this information, the ratio between total received power and the path gain of the communication resource can be computed and analyzed in the power determination module 150. Preferably, the power determination module determines a so-called delta power value (representative of how much the transmit power parameter should be changed) based on the computed power condition ratio and a target value such as C or $F_{Target}$. This generally means that if the power condition ratio is higher than the target it is possible to reduce the power, and if the ratio is too low it is possible to increase the power. The delta power value, or an absolute power value, may then be transferred to the feedback module 160, which provides this information into a form suitable for feedback to the transmitting side. If desired, the feedback module 160 is integrated into the power determination module 150. Obviously, the basic information concerning total received power, path gain and target values may as an alternative be transferred to the transmitting side for evaluation and power computations.

Figure 5:
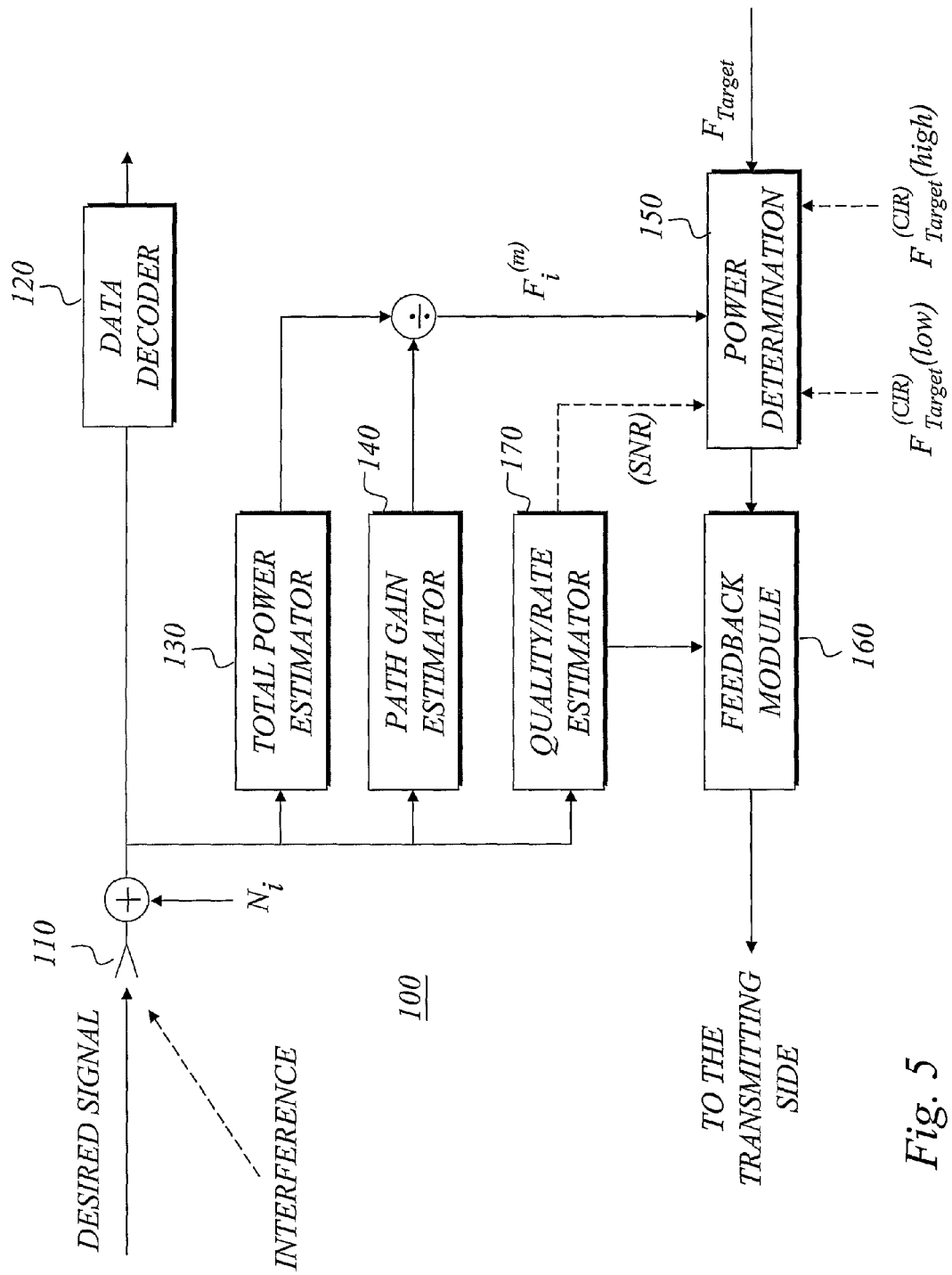
FIG. 5 is a schematic block diagram of receiver functionality according to another exemplary embodiment of the invention.

FIG. 5 is a schematic block diagram of receiver functionality according to another exemplary embodiment of the invention. In this particular example, the basic receiver functionality also includes a quality/rate estimator 170. This module provides an estimate of the quality of the communication resource by determining a signal-to-noise ratio (SNR), a carrier-to-interference ratio (CIR) or similar quality indication. Preferably, this module may also compute a transmit rate parameter, which may be transferred to the feedback module 160 for feedback to the transmitting side. Alternatively, the quality indication itself is transferred to the feedback module for transfer to the transmitting side. Either way, this allows the transmitter to perform rate adaptation, basically in dependence on the estimated quality at the receiver side. If desired, the quality indication may also be used by the power determination module 150 in the transmit power computations, as indicated by the dotted line from the quality/rate estimator 170 to the power determination module 150. The optional extension with upper and/or lower rate limits is also indicated by dotted lines in FIG. 5.

Figure 6:
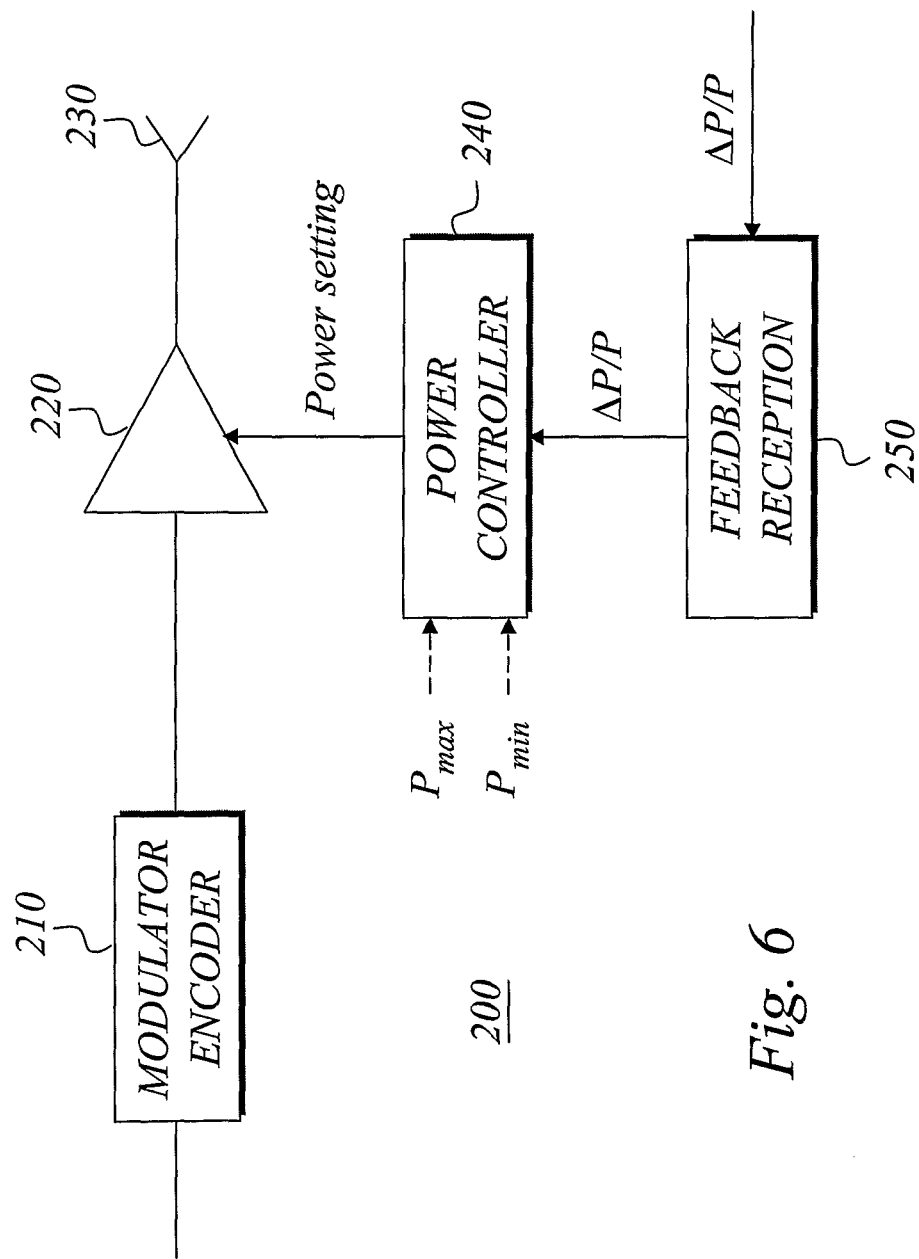
FIG. 6 is a schematic block diagram of transmitter functionality according to a preferred exemplary embodiment of the invention.

FIG. 6 is a schematic block diagram of transmitter functionality according to a preferred exemplary embodiment of the invention. The relevant transmitter functionality 200 basically includes a modulator and encoder 210, a power amplifier 220, an antenna 230 with possible further associated circuitry (not shown), a power controller 240 and a feedback reception module 250. The feedback reception module 250 is adapted for receiving feedback information representative of the transmit power or a delta power value from the receiving side. This information may then be transferred to the power controller, which takes a power control decision based on the received information and regulates the gain of the power amplifier 220 accordingly. The power controller 240 may also take information concerning upper and/or lower power limits into account if desired, as indicated by the dotted lines in FIG. 6. If desired, the feedback reception module 250 may be integrated into the power controller 240.

Figure 7:
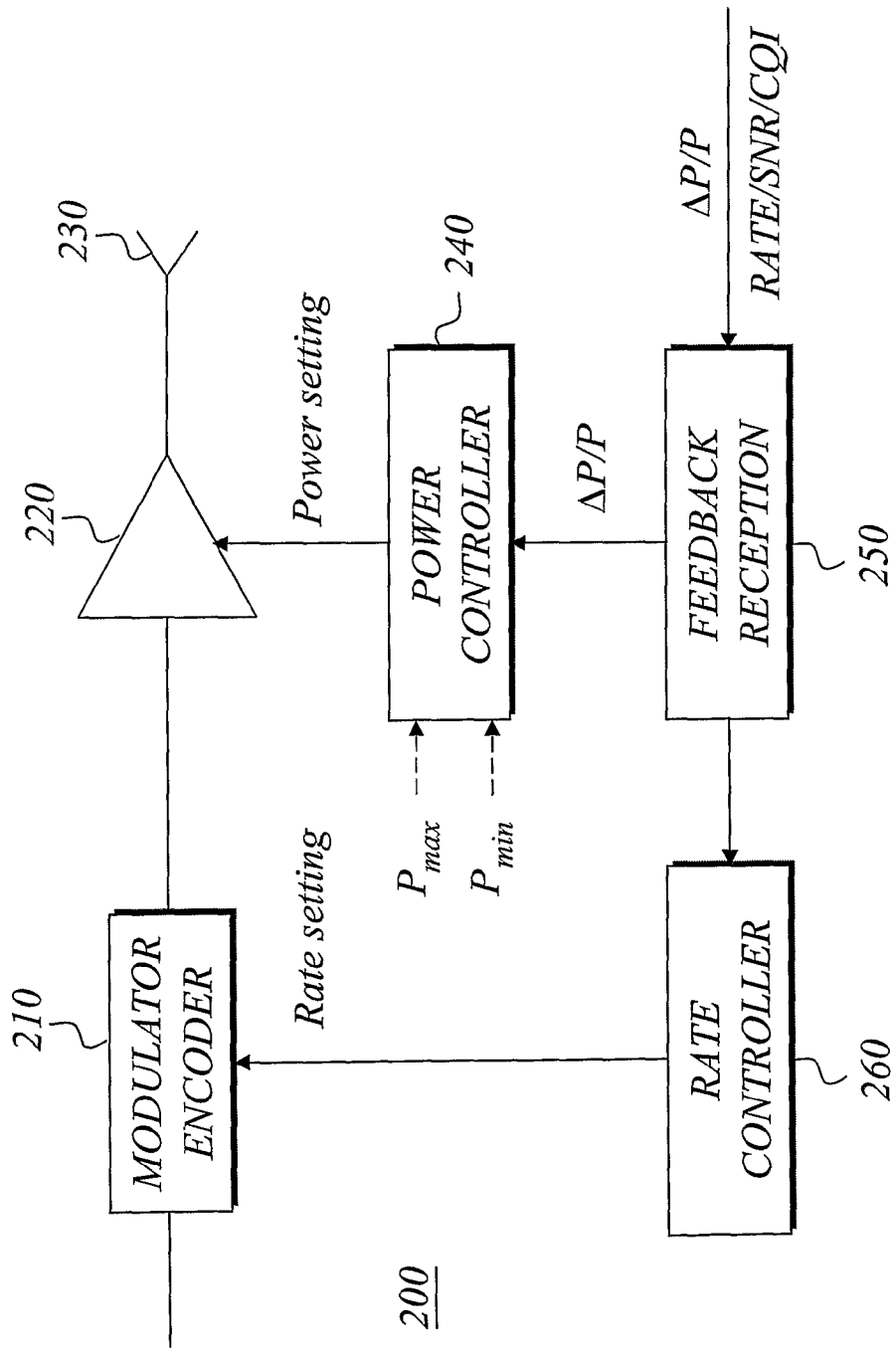
FIG. 7 is a schematic block diagram of receiver functionality according to another exemplary embodiment of the invention.

FIG. 7 is a schematic block diagram of receiver functionality according to another exemplary embodiment of the invention. In this particular embodiment, the feedback reception module 250 also receives feedback information representative of the transmit rate or a quality indication representative of the SNR or similar quality value. This rate-related information may then be transferred to a rate controller 260, which makes a final decision on a suitable transmit rate based on this information, and regulates the modulation and coding scheme of the modulator and encoder 210 accordingly.

As previously discussed, the power and rate control scheme with all its variations may be applied in different applications and scenarios.

MIMO/MISO/SIMO

A possible scenario concerns the situation when power (and rate) is/are controlled in a wireless system where multiple MIMO, MISO and/or SIMO links interfere with each other. For simplicity, we will mainly discuss the MIMO case. Here it is assumed that each MIMO link "orthogonalize" the channel into K independent and ideally non-interfering MIMO sub-channels. Although each MIMO link ideally avoids creating any self-interference, it is assumed that different MIMO links may interfere with each other. In practice, also the MIMO sub channels may interfere with each other.

A possible exemplary method to operate multiple MIMO links is as follows. Each MIMO link may strive to optimize the link performance by using receiver and transmitter antenna weights. In this way, the MIMO sub streams for a MIMO link can be orthogonalized and ideally experience no interference between the MIMO sub streams. However, it is impossible to coordinate the interference to other links, so any MIMO sub stream from one link will interfere with any other MIMO sub stream on another link. The proposed power and rate control scheme can then be applied on each MIMO sub stream.

The MIMO scenario is particularly interesting since MIMO system simulations reveal, in contrast to current beliefs, that the MIMO capacity scales linearly with the number of antennas in the MIMO array even in a cellular system with interference between MIMO sub-channels. The MIMO scenario is further of interest since has been found that the probability that a user experiences a rate identical to zero is reduced with increasing number of antennas.

OFDM(A)

The invention is also applicable to sub-carriers for OFDM (A), which sub-carriers are regarded as multiple interfering communication resources, and treated similarly to the interfering links in the examples described above. Preferably, the invention is applied independently for each sub-carrier or a group (a.k.a. as a chunk) of sub carriers.

To give a concrete example, consider a set of base stations using OFDM(A) and intended to send data to different mobile users in downlink. For a base station, a user may have been selected to receive on a sub carrier or a group of sub carriers. Considering this sub carrier or a group of sub carriers, a set of users is selected when considering multiple base stations. Power and rates are controlled according to the invention. Another sub carrier or group of sub carriers may, since we are dealing with OFDM(A), consider another set of users to transmit to. Overall, many different sets of users may be considered over the frequency and time resources in OFDM (A). Also note that MIMO, MISO, SIMO and SISO may be used for each user on each sub carrier or group of sub carriers.

Moreover, in OFDM and OFDMA, inter-channel-interference may arise when the local oscillators in the sender and the receiver are not perfectly aligned or when Doppler spread exists in the channel. The power control could actually also be employed over partially interfering OFDM(A) sub carriers to reduce the interference impact somewhat.

Other Scenarios for the Power (and Rate) Control Method

The proposed power (and rate) control strategy may also be used in i) CDMA downlink (with or without multiuser detectors, the latter becoming equivalent to the broadcast channel within the information theory), CDMA uplink with successive interference cancellation based multiuser detectors (the successive interference cancellation is needed to avoid contradicting control criteria (5) for different links connecting to the same base station). Moreover, the transmitting nodes may be selected from a larger set of potential transmitters. Such selection could for example be based on the instantaneous channel quality between the potential transmitter and the receiver, i.e. a sender that experiences a peak channel opportunity and has some data to send will be selected as a sender. This channel dependent scheduling is often denoted opportunistic scheduling or multiuser diversity based scheduling.

Clearly, the invention is not limited to cellular systems, but may also be used in other systems such as relay assisted cellular systems, wireless ad hoc, or wireless multihop systems.

Performance and Proof of Concept

Figure 8:
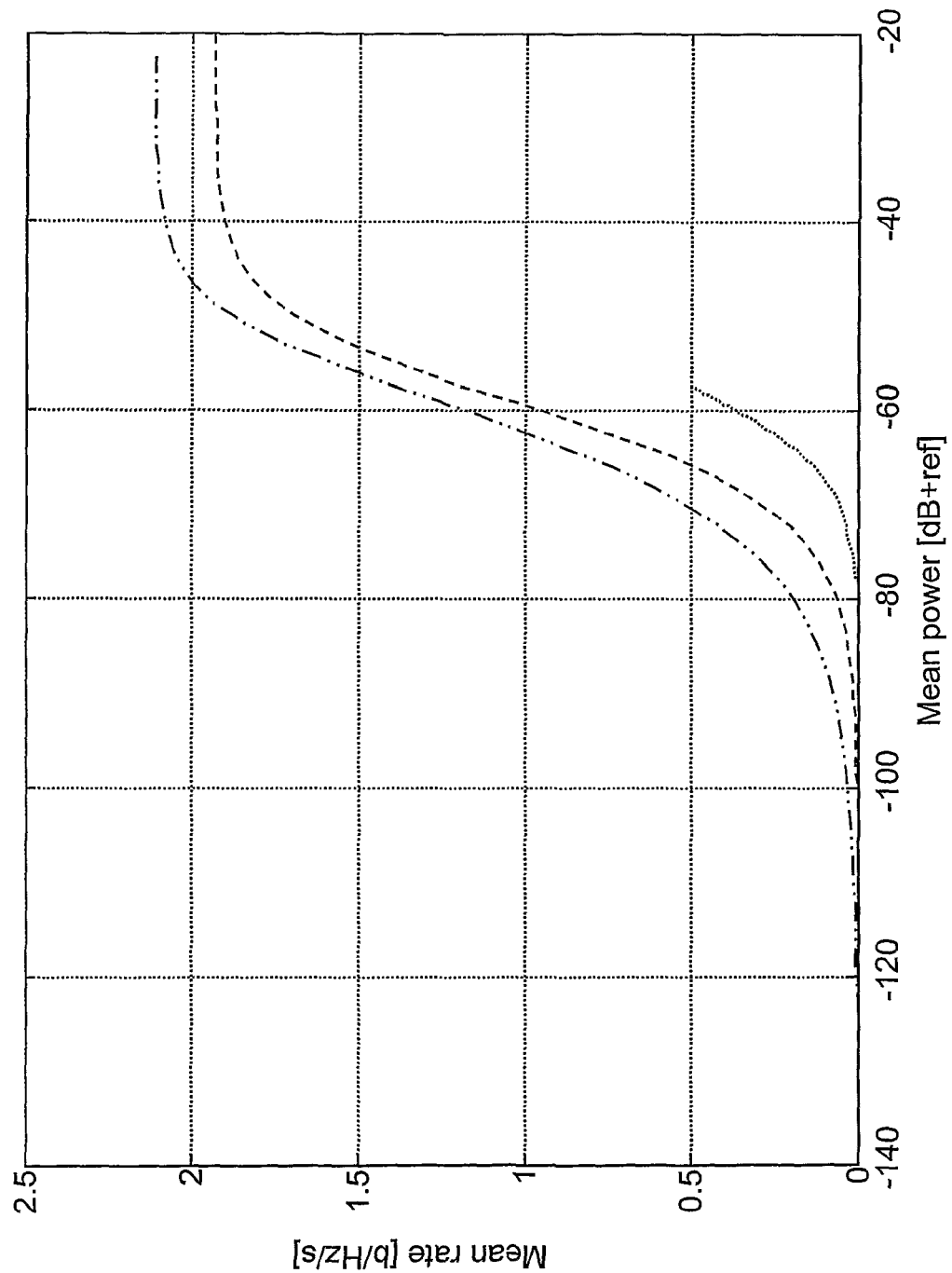
FIG. 8 is a schematic diagram illustrating the mean rate as a function of mean power for the proposed scheme, a fixed power scheme and a CIR balancing scheme.

In FIG. 8, the performance of the proposed scheme is compared with two prior art methods, i) fixed identical transmit powers with rate adaptation and, ii) power control resulting in identical CIRs (CIR balancing) and hence identical rates. The system is composed of contains 400 hexagonal cells with a link in each cell that is power controlled. The path loss model has a power law loss exponent of $\alpha=3.0$. In FIG. 8, the mean rate (or aggregate rate divided by the number of links) versus the mean power (or aggregate power divided by the number of links) is shown. The upper line shows the proposed scheme according to the invention, the middle line is the fixed transmit power scheme, and the lower line is the CIR balancing scheme. It can be noted that the proposed scheme performs better than any of the prior art schemes, generally allowing a higher rate for the invested amount of power.

Figure 9:
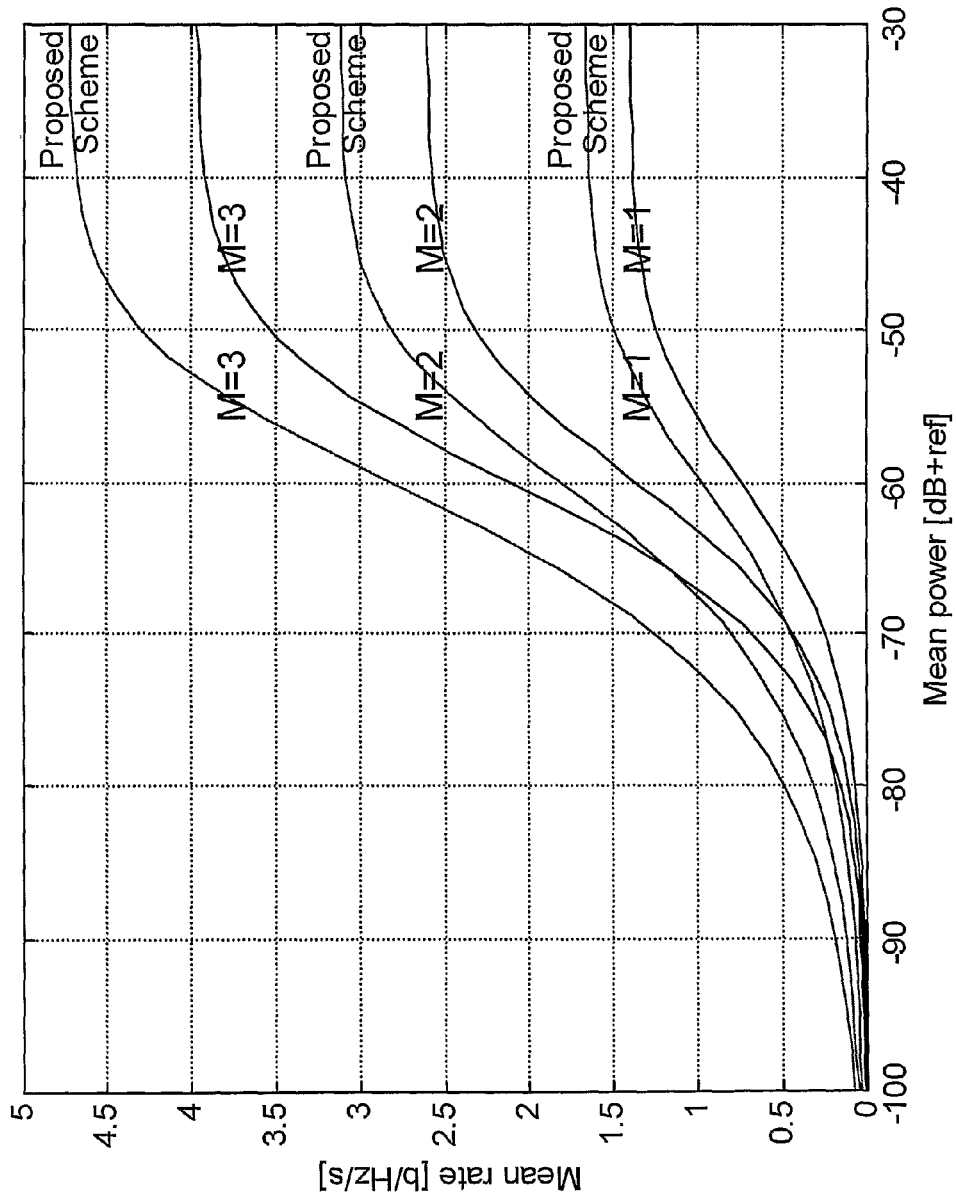
FIG. 9 is a schematic diagram illustrating the mean rate as a function of mean power for the proposed scheme and a fixed power scheme using different number of antennas.

FIG. 9 is a schematic diagram illustrating the mean rate as a function of mean power for the proposed scheme and a fixed power scheme using different number of antennas. The performance of the proposed scheme (in this MIMO application) and the fixed power scheme with rate control are considered for an upper rate limit of 3 b/Hz/s and MIMO with M antennas in the MIMO array. Three different cases are considered with M=1, 2, and 3. The mean rate vs. mean transmit power is depicted in FIG. 9 for the two power and rate control schemes as well the different MIMO cases. It is clear that the proposed scheme performs better of the two power and rate control schemes.

Figures 10A, 10B, 10C:
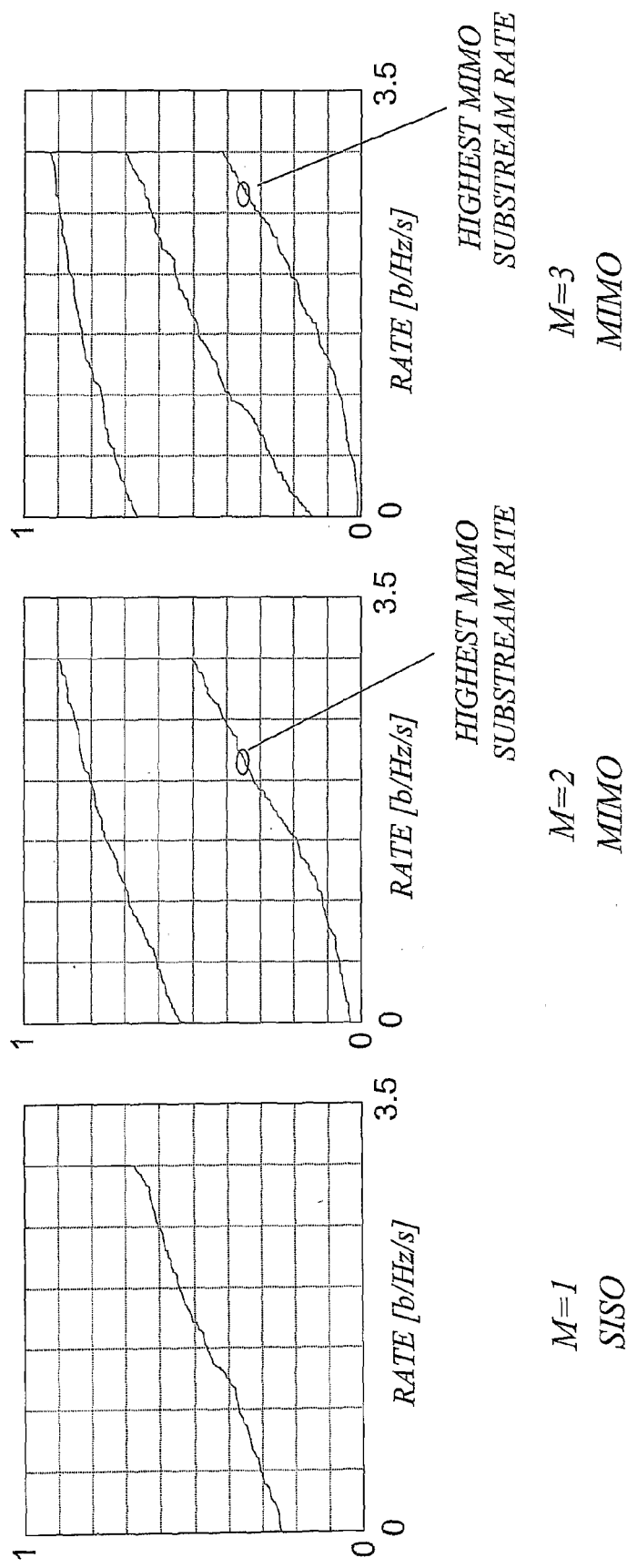
FIGS. 10 A-C are schematic diagrams illustrating the cumulative density functions of the various MIMO streams/sub-streams for different number of MIMO array antennas in a system with multiple interfering MIMO links.

It is also of interest to show that the transmit power may be controlled such that the upper rate limit is not exceeded. FIGS. 10 A-C are schematic diagrams illustrating the cumulative density functions (CDFs) of the streams/sub-streams for different number of antennas, considering the case when the mean power=−40 [dB+ref] (see FIG. 9). To be more precise, the substreams of each link are ordered in rate performance, and the MIMO substreams for different links that have the same ordering position are grouped together, and the CDF for each MIMO substream group is then shown in the figures. It is evident from FIGS. 10A-C that the rates are upper limited to a maximum rate of 3 b/Hz/s. The lower rate limit is set to zero b/Hz/s. It is also clear that not all links are served when M=1, roughly 25% of the links, but when MIMO is used and the number of antennas increases, each user appears statistically guaranteed to be served and get some data rate, although potentially low.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Fredrik Bergren, "*Power control and adaptive resource allocation in DS-CDMA systems*", PhD dissertation June 2003, pp. 12-18, 163-173.

[2] Demirkol and Ingram, "Stream Control in Networks with Interfering MIMO Links", IEEE Wireless Communications and Networking Conference, March 2003.

The invention claimed is:

1. A method of controlling transmit parameters including transmit power parameters in a wireless communication system having multiple interfering communication resources, comprising:
    assigning a common control parameter to said multiple interfering communication resources, wherein said multiple interfering communication resources comprise radio transmission resources;
    determining, for each one of at least a subset of said multiple interfering communication resources, an individual transmit power parameter based on a power control condition implying that a total received power divided with a path gain of the interfering communication resource should correspond to the common control parameter, wherein said step of determining an individual transmit power parameter includes the steps of:
        determining, for the subset of said multiple interfering communication resources, a deviation of a current ratio of the total received power divided with the path gain of the interfering communication resource from the common control parameter; and
        adjusting the individual transmit power parameter to compensate for the deviation; and
    controlling, based on the determined transmit power parameters, the transmit powers of the corresponding multiple interfering communication resources.

2. The method of claim 1, wherein said common control parameter is adjusted depending on at least one of traffic load and Quality of Service (QoS) requirements.

3. The method of claim 1, wherein said common control parameter is assigned such that an aggregate transmit power of said multiple interfering communication resources fulfils a given aggregate transmit power constraint.

4. The method of claim 1, further comprising the step of controlling, for each one of at least a subset of said multiple interfering communication resources, an individual transmit rate based on the determined individual transmit power and experienced transmission quality of the interfering communication resource.

5. The method of claim 1, wherein said multiple interfering communication resources correspond to multiple interfering links between transmitter-receiver node pairs, and the transmit power parameters of the transmitter of said node pairs are determined such that, for each one of at least a subset of said links, the total power received at the receiver divided with the path gain of the link between the node pair corresponds to the common control parameter.

6. The method of claim 1, wherein said multiple interfering communication resources are selected from at least one of frequency-based communication resources, code-based communication resources and spatial-multiplexing-based communication resources.

7. The method of claim 6, wherein said multiple interfering communication resources are at least one of MIMO (Multiple Input Multiple Output) sub-channels, sub-carriers in a wireless OFDM (Orthogonal Frequency Division Multiplexing) or OFDMA (Orthogonal Frequency Division Multiple Access) system, and code-based resources in a wireless CDMA (Code Division Multiple Access) system.

8. The method of claim 1, wherein said step of determining an individual transmit power parameter includes the steps of:
   measuring, for the interfering communication resource, the total received power including the power of a desired signal as well as interference plus noise;
   estimating, for the interfering communication resource, the path gain of the resource; and
   determining the individual transmit power parameter based on said measured received power and said estimated path gain.

9. The method of claim 1, further comprising the step of determining, for at least one of said multiple interfering communication resources, an individual transmit power parameter under an upper transmit power constraint for limiting a maximum transmit power level.

10. The method of claim 1, further comprising the step of determining, for at least one of said multiple interfering communication resources, an individual transmit power parameter such that a corresponding transmit rate of the interfering communication resource does not exceed a given maximum transmit rate.

11. The method of claim 10, wherein said step of determining an individual transmit power parameter such that the corresponding transmit rate of the communication resource does not exceed a given maximum transmit rate includes the steps of:
   checking, for the interfering communication resource, that a communication quality of the interfering resource does not violate a quality constraint corresponding to said given maximum rate; and
   controlling the corresponding transmit power parameter in dependence on the outcome of said step of checking.

12. An arrangement for controlling transmit parameters in a wireless communication system having multiple interfering communication resources, comprising:
   an antenna;
   processing circuitry;
   the processing circuitry configured for assigning a common control parameter to said multiple interfering communication resources, wherein said multiple interfering communication resources comprise radio transmission resources;
   the processing circuitry further configured for determining, for each one of at least a subset of said multiple interfering communication resources, an individual transmit power parameter based on a power control condition implying that a total received power divided with a path gain of the communication resource should correspond to the common control parameter;
   the processing circuitry further configured for determining, for the interfering communication resource, a deviation of a current ratio of the total received power divided with the path gain of the interfering communication resource from the common control parameter;
   the processing circuitry further configured for adjusting the transmit power parameter to compensate for the deviation; and
   the processing circuitry configured for controlling, based on the determined transmit power parameters, the transmit powers of the corresponding multiple interfering communication resources.

13. The arrangement of claim 12, wherein the processing circuitry is operable for dynamically assigning said common control parameter depending on at least one of traffic load and Quality of Service (QoS) requirements.

14. The arrangement of claim 12, wherein the processing circuitry is operable for assigning said control parameter such that a total aggregate transmit power of said multiple interfering communication resources fulfils a given aggregate transmit power constraint.

15. The arrangement of claim 12, wherein the processing circuitry is further configured for controlling, for each one of at least a subset of said multiple interfering communication resources, an individual transmit rate based on the determined transmit power and experienced transmission quality of the interfering communication resource.

16. The arrangement of claim 12, wherein said multiple interfering communication resources correspond to multiple interfering links between transmitter-receiver node pairs, and said processing circuitry is operable for determining, for each node pair, the transmit power parameter of the transmitter such that the total power received at the receiver divided with the path gain of the link between the node pair corresponds to the common control parameter.

17. The arrangement of claim 12, wherein said multiple interfering communication resources include at least one of frequency-based communication resources, code-based communication resources and spatial-multiplexing-based communication resources.

18. The arrangement of claim 17, wherein said multiple interfering communication resources are at least one of MIMO sub-channels, sub-carriers in a wireless OFDM (Orthogonal Frequency Division Multiplexing) or OFDMA (Orthogonal Frequency Division Multiple Access) system, and code-based resources in a wireless CDMA (Code Division Multiple Access) system.

19. The arrangement of claim 12, wherein said processing circuitry is further configured:
   for measuring, for the interfering communication resource, the total received power including the power of a desired signal as well as interference plus noise;
   for estimating, for the interfering communication resource, the path gain of the resource; and
   for determining the individual transmit power parameter based on said measured received power and said estimated path gain.

20. The arrangement of claim 12, wherein said processing circuitry operates according to an iterative procedure.

21. The arrangement of claim 12, wherein the processing circuitry is further configured for determining, for at least one of said multiple interfering communication resources, an individual transmit power parameter under an upper transmit power constraint for limiting a maximum transmit power level.

22. The arrangement of claim 12, wherein the processing circuitry is further configured for determining, for at least one of said multiple interfering communication resources, an individual transmit power parameter such that a corresponding transmit rate of the interfering communication resource does not exceed a given maximum transmit rate.

23. The arrangement of claim 22, wherein the processing circuitry is operable for checking, for the considered communication resource, that a communication quality of the resource does not violate a quality constraint corresponding to said given maximum rate, and for controlling the corresponding transmit power parameter in dependence on the outcome of said checking.

* * * * *

UNITED STATES PATENT AND TRADEMARK OFFICE
CERTIFICATE OF CORRECTION

PATENT NO.        : 8,849,334 B2                                                    Page 1 of 1
APPLICATION NO.   : 12/298690
DATED             : September 30, 2014
INVENTOR(S)       : Larsson It is certified that error appears in the above-identified patent and that said Letters Patent is hereby corrected as shown below:

In the specification,

In Column 9, Line 30, delete "($G_{ii}$>>G)" and insert -- ($G_{ii}$>>$G_{ij}$) --, therefor.

In Column 16, Line 7, delete "Bergren," and insert -- Berggren, --, therefor.

Signed and Sealed this
First Day of March, 2016

Michelle K. Lee
*Director of the United States Patent and Trademark Office*